United States Patent [19]
Yoshida

[11] Patent Number: 5,408,617
[45] Date of Patent: Apr. 18, 1995

[54] INTER-SYSTEM COMMUNICATION SYSTEM FOR COMMUNICATING BETWEEN OPERATING SYSTEMS USING VIRTUAL MACHINE CONTROL PROGRAM

[75] Inventor: Tomio Yoshida, Kawasaki, Japan

[73] Assignee: Fujitsu Limited, Kawasaki, Japan

[21] Appl. No.: 867,518

[22] Filed: Apr. 13, 1992

[30] Foreign Application Priority Data

Apr. 12, 1991 [JP] Japan .................. 3-079395

[51] Int. Cl.$^6$ ............................................ G06F 13/00
[52] U.S. Cl. ..................................... 395/325; 395/700; 364/280; 364/284; 364/284.1; 364/DIG. 1; 364/978.1; 364/978.2; 364/DIG. 2
[58] Field of Search ............... 395/725, 325, 200, 250, 395/700, 650; 364/280, 284, 284.1, 284.4, DIG. 1, 978.1, 978.2, DIG. 2

[56] References Cited

U.S. PATENT DOCUMENTS

| | | | |
|---|---|---|---|
| 4,564,900 | 1/1986 | Smitt | 395/325 |
| 4,631,666 | 12/1986 | Harris et al. | 395/325 |
| 4,742,447 | 5/1988 | Duvall et al. | 395/375 |
| 4,764,864 | 8/1988 | Takane | 395/725 |
| 4,831,541 | 5/1989 | Eshel | 395/146 |
| 4,835,677 | 5/1989 | Sato et al. | 395/700 |
| 4,914,619 | 4/1990 | Harris et al. | 395/200 |
| 4,916,608 | 4/1990 | Shultz | 395/650 |
| 5,062,037 | 10/1991 | Shorter et al. | 395/325 |
| 5,063,500 | 11/1991 | Shorter | 395/200 |
| 5,088,031 | 2/1992 | Takasaki et al. | 395/400 |
| 5,144,692 | 9/1992 | Baker et al. | 395/425 |
| 5,257,386 | 10/1993 | Saito | 395/775 |

Primary Examiner—Jack B. Harvey
Assistant Examiner—Glenn A. Auve
Attorney, Agent, or Firm—Staas & Halsey

[57] ABSTRACT

An inter-system communication system makes a communication between at least two operating systems. The inter-system communication system includes a virtual machine control program for generally controlling at least first and second operating systems, a data transfer mechanism provided in the virtual machine control program, a request part provided in each of the first and second operating systems for transmitting a transfer request to the data transfer mechanism, and a main storage region provided in each of the first and second operating systems and having a buffer region. The data transfer mechanism transfers data between the buffer region within the main storage region of the first operating system and the buffer region within the main storage region of the second operating system in response to a transfer request from the request part of one of the first and second operating systems.

12 Claims, 5 Drawing Sheets

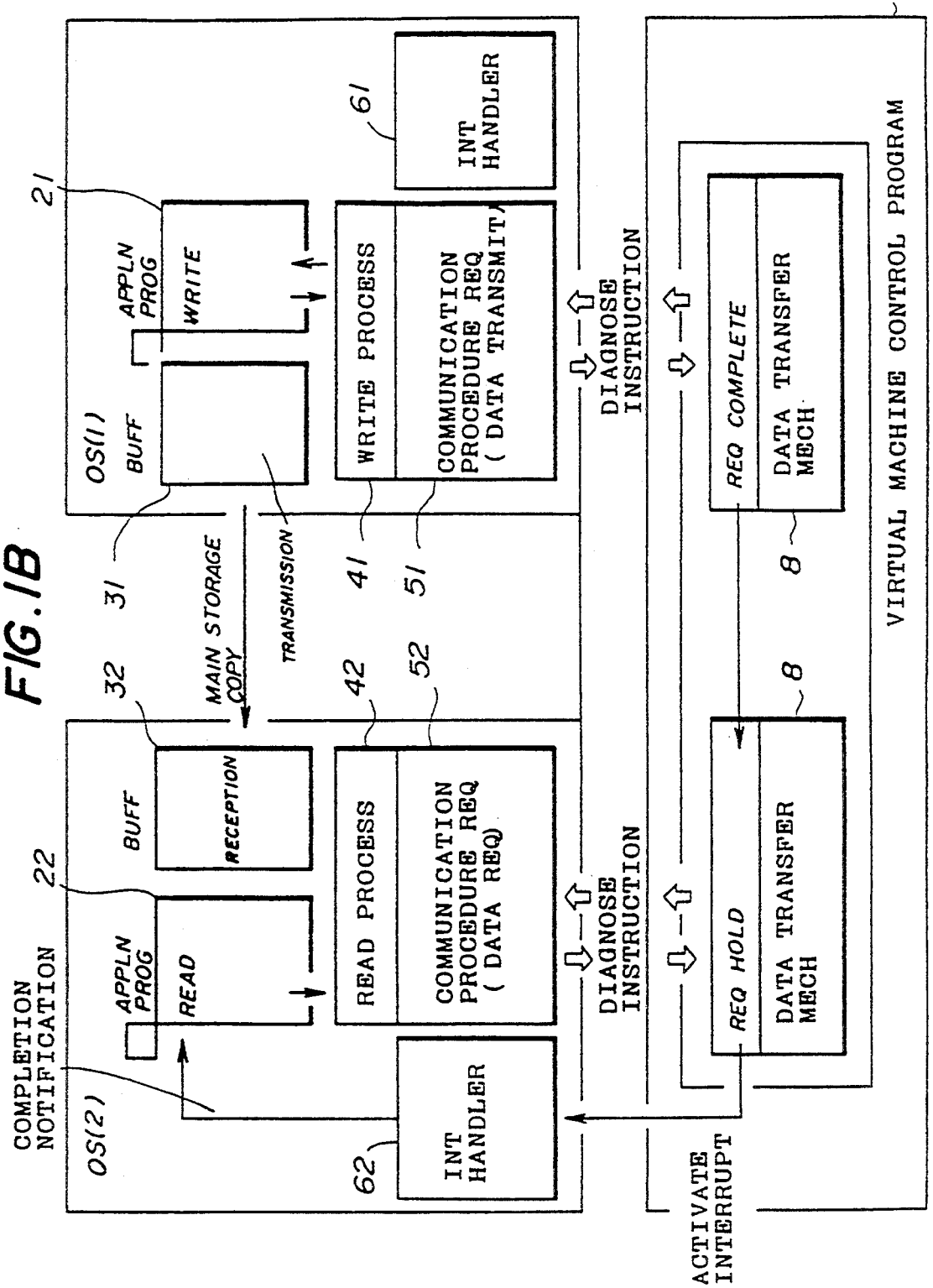

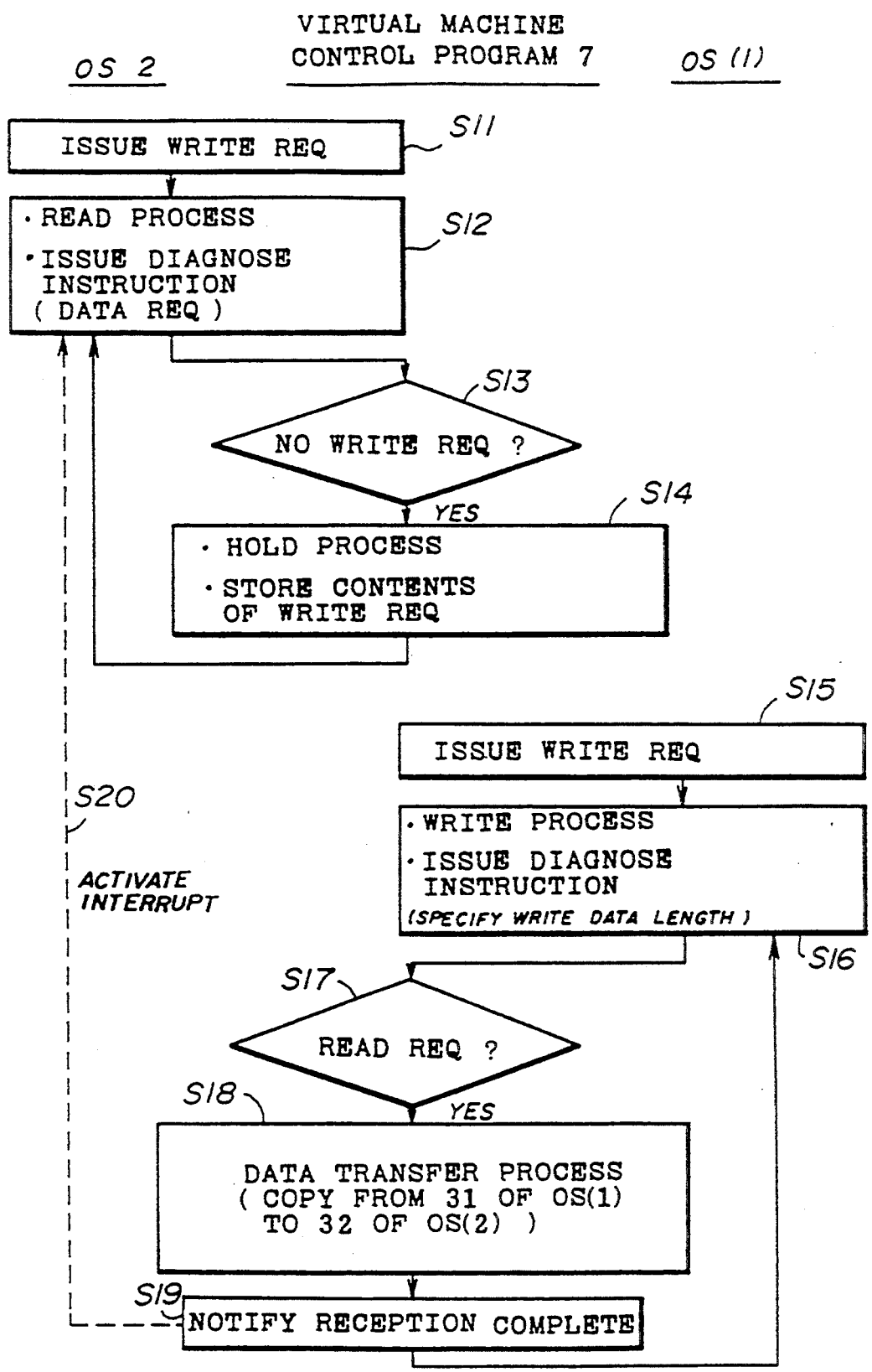

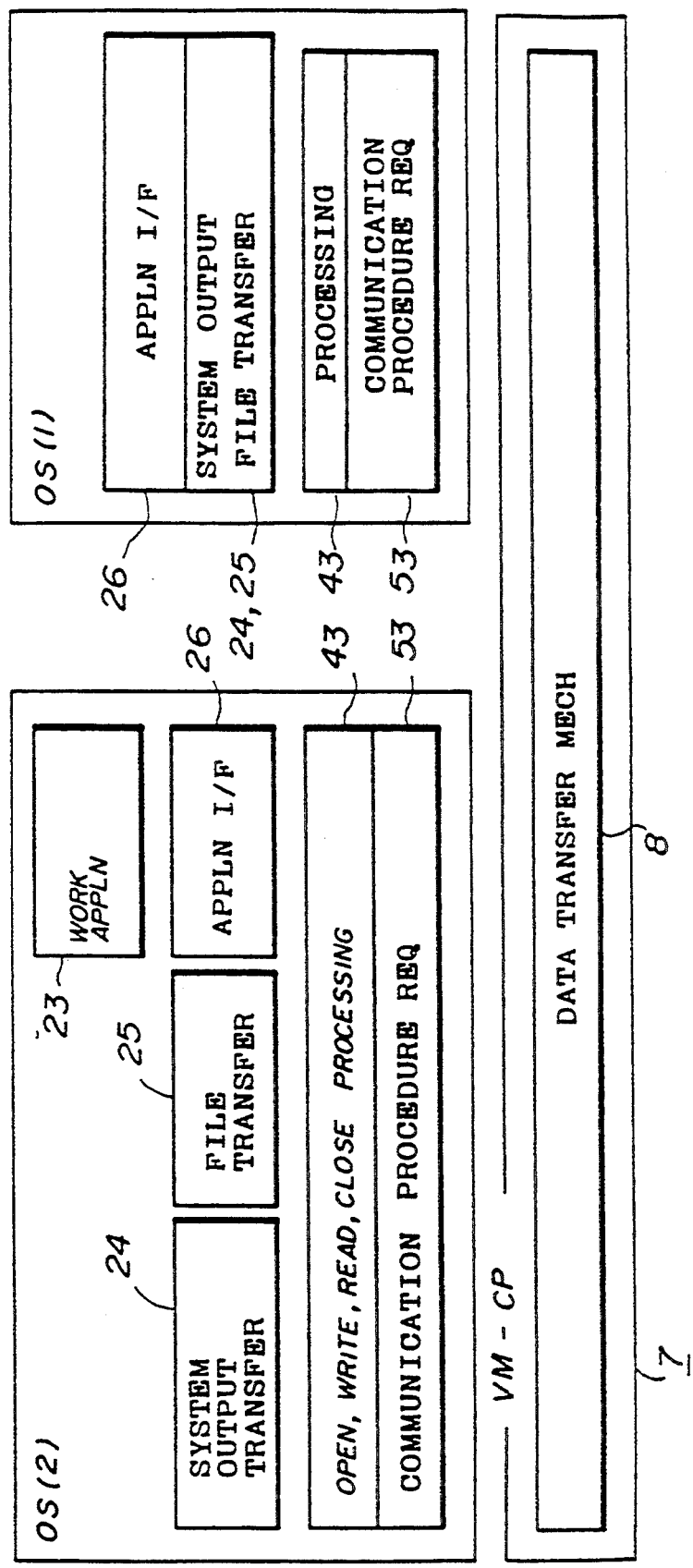

INTER-SYSTEM COMMUNICATION SYSTEM FOR COMMUNICATING BETWEEN OPERATING SYSTEMS USING VIRTUAL MACHINE CONTROL PROGRAM

BACKGROUND OF THE INVENTION

The present invention generally relates to inter-system communication systems, and more particularly to an inter-system communication system for carrying out a high-speed communication between operating systems which operate under a virtual memory.

In general purpose computers and in small to medium scale general purpose computers in particular, there are demands to realize a high-speed communication among a plurality of operating systems because the work throughput considerably decreases due to the overhead of the virtual machine system.

Among a plurality of operating systems which operate under a virtual memory, it is necessary to realize a high-speed communication between the operating systems in order to transfer system outputs, transfer files and link data of work programs between the operating systems, such as when converting from a present operating system to a new operating system and when carrying out a distributed parallel processing between the operating systems. Conventionally, the communication among the operating systems which operated under the virtual memory is realized by actually connecting a communication unit to the virtual memory or by simulating the communication unit by a virtual machine control program.

Therefore, there is a problem in that an install (or network generation) operation must be carried out for each operating system which is to make a communication. For example, the install (or network generation) operation includes defining the communication unit, defining the network and the like. In addition, there is a problem in that the simulation of the communication unit increases the load of the virtual machine control program.

SUMMARY OF THE INVENTION

Accordingly, it is a general object of the present invention to provide a novel and useful inter-system communication system in which the problems described above are eliminated.

Another and more specific object of the present invention is to provide an inter-system communication system for making a communication between at least two operating systems, comprising a virtual machine control program for generally controlling at least first and second operating systems, a data transfer mechanism provided in the virtual machine control program, a request means, provided in each of the first and second operating systems, for transmitting a transfer request to the data transfer mechanism, and a main storage region provided in each of the first and second operating systems and having a buffer region, where the data transfer mechanism transfers data between the buffer region within the main storage region of the first operating system and the buffer region within the main storage region of the second operating system in response to a transfer request from the request means of one of the first and second operating systems. According to the inter-system communication system of the present invention, it is unnecessary to carry out an install or network generation operation for each operating system which is to make a communication. Furthermore, a completion of the data transfer can be notified by a single interrupt, and a high-speed communication can be realized between the operating systems without putting a large load on the virtual machine control program. Therefore, the present invention facilitates the deign of a distributed system having a plurality of operating systems which are under control of a virtual machine, and the performance of the distributed system can greatly be improved.

Other objects and further features of the present invention will be apparent from the following detailed description when read in conjunction with the accompanying drawings.

BRIEF DESCRIPTION OF THE DRAWINGS

FIG. 1B is a system block diagram showing the embodiment of the inter-system communication system according to the present invention for explaining the operating principle of the present invention when holding a read request;

FIG. 3 is a flow chart for explaining the operation of the embodiment when holding the read request; and FIG. 4 is a system block diagram showing an essential part of the embodiment.

DESCRIPTION OF THE PREFERRED EMBODIMENTS

Figure 1A:
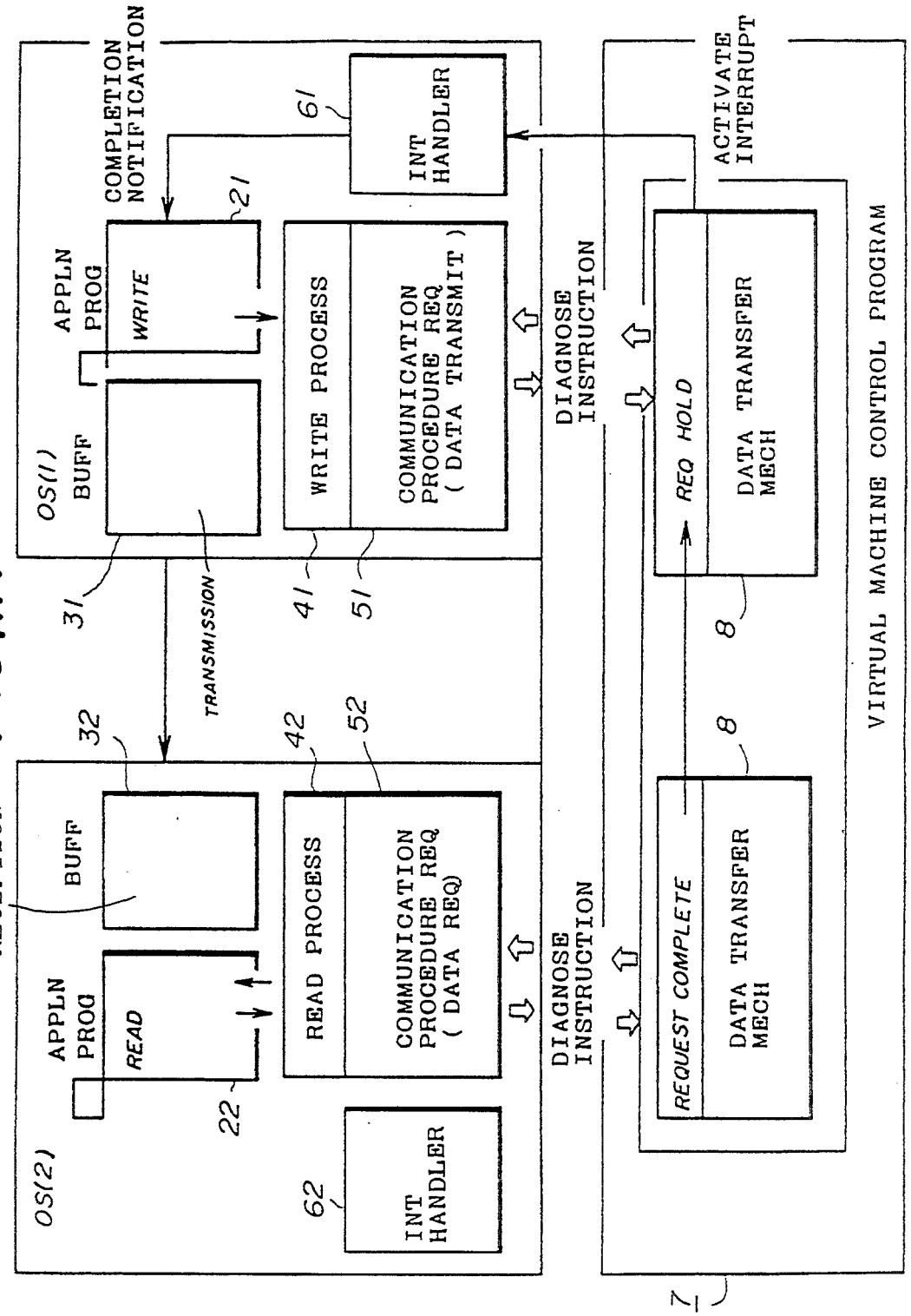
FIG. 1A is a system block diagram showing an embodiment of an inter-system communication system according to the present invention for explaining the operating principle of the present invention when holding a write request.

First, a description will be given of the operating principle of the present invention, by referring to FIGS. 1A and 1B. FIG. 1A shows a block diagram for explaining the operating principle of the present invention when holding a write request, and FIG. 1B shows a block diagram for explaining the operating principle of the present invention when holding a read request.

In FIGS. 1A and 1B, communication procedure request parts 51 and 53 respectively decompose a write/read request into a protocol of a communication procedure, and the write/read request is notified to data transfer mechanisms 8 in the form of the protocol, that is, in conformance with the communication procedure. The data transfer mechanisms 8 are provided within a virtual machine control program 7 which generally controls operating systems OS(1) and OS(2), and enable a data transfer between regions of the operating systems OS(1) and OS(2) provided within the virtual machine control program 7.

As shown in FIG. 1A, if a write request is generated within the operating system OS(1), for example, the communication procedure request part 51 notifies the data transfer mechanism 8 of the write request by decomposing the write request into a protocol and transferring the write request in conformance with a communication procedure. The data transfer mechanism 8 which receives the above notification from the communication procedure request part 51 makes a data transfer between regions (buffers 32 and 31) of the operating systems OS(2) and OS(1) and makes an interrupt to notify a completion of the read request to the operating system OS(1) if the operating system OS(1) holds a read request from the operating system OS(2). On the other hand, the data transfer mechanism 8 which receives the above notification from the communication procedure request part 51 holds the write request if no read request is held, and makes a data transfer between the regions of the operating systems OS(2) and OS(1) and makes an interrupt to notify a completion of the write request to the operating system OS(1) which holds the write request if the read request from the operating system OS(2) is notified to the data transfer mechanism 8 in conformance with the communication procedure.

Similarly, as shown in FIG. 1B, if a read request is generated within the operating system OS(2), for example, the communication procedure request part 52 notifies the data transfer mechanism 8 of the read request by decomposing the read request into a protocol and transferring the read request in conformance with a communication procedure. The data transfer mechanism 8 which receives the above notification from the communication procedure request part 52 makes a data transfer between regions (buffers 31 and 32) of the operating systems OS(1) and OS(2) and makes an interrupt to notify a completion of the write request to the operating system OS(2) if the operating system OS(2) holds a write request from the operating system OS(1). On the other hand, the data transfer mechanism 8 which receives the above notification from the communication procedure request part 52 holds the read request if no write request is held, and makes a data transfer between the regions of the operating systems OS(1) and OS(2) and makes an interrupt to notify a completion of the read request to the operating system OS(2) which holds the read request if the read request from the operating system OS(1) is notified to the data transfer mechanism 8 in conformance with the communication procedure.

Accordingly, because the communication between the operating systems OS(1) and OS(2) is made by providing the data transfer mechanisms 8 within the virtual machine control program 7, it is unnecessary to carry out an install (or network generation) operation for each operating system which is to make the communication. It is sufficient to simply notify the completion of the write/read request by one interrupt when the write/read request is made, and a high-speed communication can be realized between the operating systems OS(1) and OS(2) without putting a large load on the virtual machine control program 7.

Next, a description will be given of an embodiment of the inter-system communication system according to the present invention, by referring to FIGS. 1A and 1B.

The operating systems OS(1) and OS(2) shown in FIGS. 1A and 1B carry out various kinds of control. For example, the operating systems OS(1) and OS(2) may respectively correspond to an existing operating system and a new operating system, or simply a plurality of operating systems. The operating system OS(1) includes an application program 21, a transmission buffer 31, a write processing part 41, a communication procedure request part 51 and an interrupt handler 61. The operating system OS(2) includes an application program 22, a reception buffer 32, a read processing part 42, a communication procedure request part 52 and an interrupt handler 62.

The application programs 21 and 22 respectively operate under the operating systems OS(1) and OS(2), and issue a write request or a read request so as to make a data transfer to the other operating system.

Figure 2:
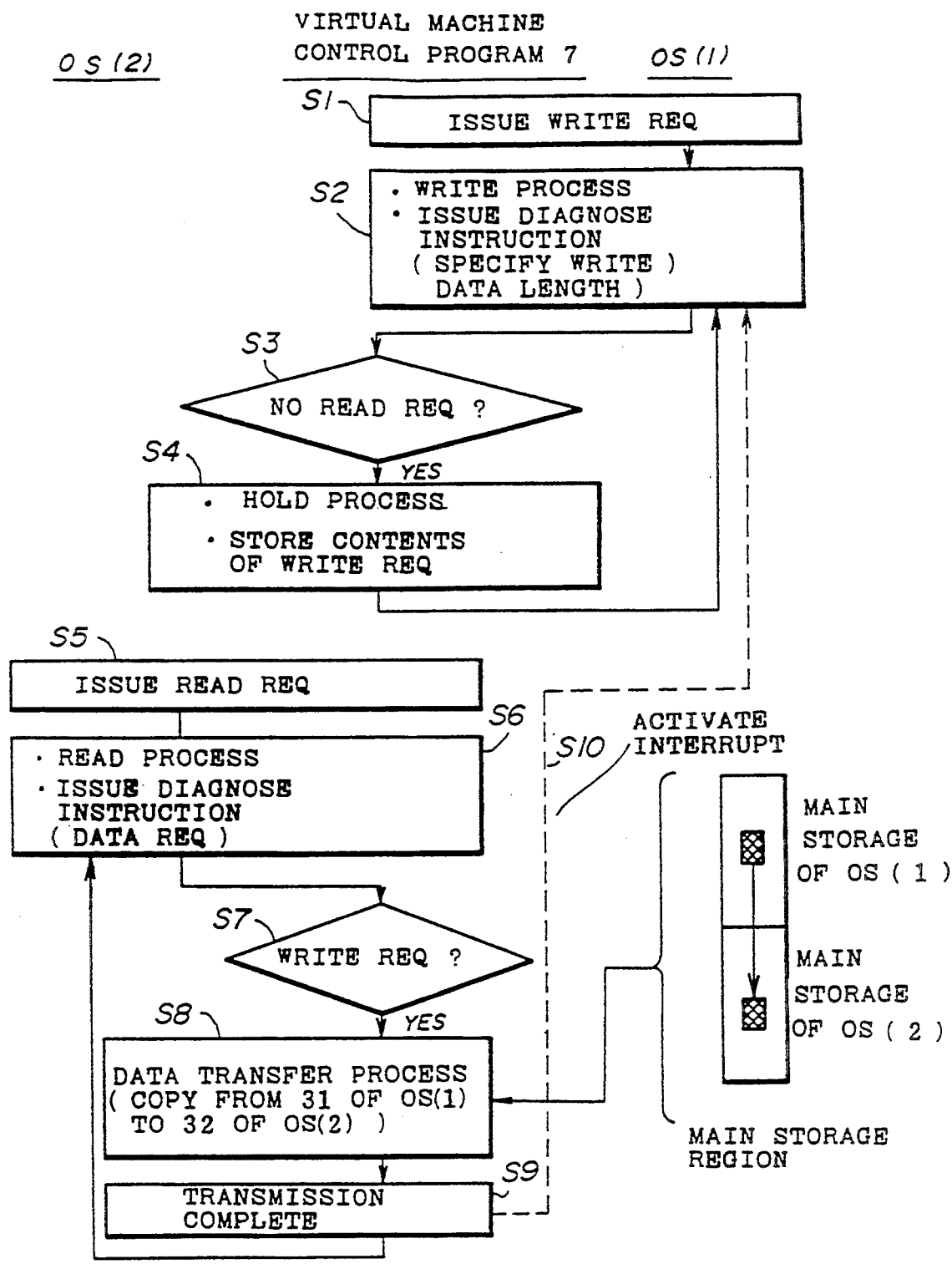
FIG. 2 is a flow chart for explaining the operation of the embodiment when holding the write request.

The transmission buffer 31 and the reception buffer 32 are provided in main storage regions of the respective operating systems OS(1) and OS(2) as may be seen from FIG. 2, so as to make a data transfer between the operating systems OS(1) and OS(2). The regions of the transmission buffer 31 and the reception buffer 32 are converted into real addresses by fixing the page at the time of an open process. When making a copy process, the real addresses are used to directly copy the data in the transmission buffer 31 to the reception buffer 32, and this direct copy may be realized by a main storage transfer instruction or the like.

The write processing part 41 carries out a write process by analyzing the write request from the application program 21. The read processing part 42 carries out a read process by analyzing the read request from the application program 22.

The communication procedure request parts 51 and 52 respectively decompose the write request from the write processing part 41 and the read request from the read processing part 42 into communication procedures such as a connect request, a connect acknowledge, a transmission request, a transmission acknowledge and a disconnect request, and makes a request to the data transfer mechanisms 8 within the virtual machine control program 7 by issuing a diagnose instruction.

The interrupt handlers 61 and 62 respectively notify the completion of the transmission from the data transfer mechanisms 8 to the respective operating systems OS(1) and OS(2) by an interrupt thereto. In this embodiment, the completion of the transmission can be realized by one interrupt with respect to two requests, that is, the write request and the read request. Hence, the interrupt load to notify the completion of the transmission to the operating system is reduced by one-half.

The virtual machine control program 7 is a control program for operating the operating systems OS(1) and OS(2) and the like in different spaces.

The data transfer mechanisms 8 make a data transfer between the regions of the operating systems OS(1) and OS(2) provided within the virtual machine control program 7 which generally controls the operating systems OS(1) and OS(2). As will be described later in conjunction with FIGS. 2 and 3, the data transfer mechanisms 8 make the data transfer between the regions of the operating systems OS(1) and OS(2) in response to the write or read request, by copying the data between the regions. In addition, the data transfer mechanisms 8 notifies the completion of the data transfer to the operating system which is held by an interrupt. A necessary number of communication channels are set depending on the operating systems which are defined at the time when the virtual machine control program 7 is started, and these communication channels are allocated in the sequence of the connection requests from the operating systems. The communication channels are released when a disconnect request is made.

Next, a more detailed description will be given of the embodiment for the case where the write request is held in FIG. 1A, by referring to FIG. 2.

In FIG. 2, a step S1 issues a write request. This write request is issued from the application program 21 of the operating system OS(1).

A step S2 carries out a write process and issues a diagnose instruction to specify the write data length. More particularly, the write processing part 41 of the operating system OS(1) shown in FIG. 1A analyzes the write request issued from the application program 21, and the communication procedure request part 51 specifies the write data length by the diagnose instruction so as to instruct the data transfer. The transmission buffer 31 of the operating system OS(1) and the address of this transmission buffer 31, and the reception buffer 32 of the operating system OS(2) and the address of this reception buffer 32 are set during an open process.

A step S3 decides whether or not there is no read request (or no read request is held). In this case, no read request is held, and the process advances to a step S4 because the decision result in the step S3 is YES.

The step S4 carries out a hold process to store the contents of the write request, and the series of operations of the write process once end.

A step S5 issues a read request. This read request is issued from the application program 22 of the operating system OS(2) shown in FIG. 1A.

A step S6 carries out a read process and issues a diagnose instruction to make the data request. More particularly, the read processing part 42 of the operating system OS(2) shown in FIG. 1A analyzes the read request issued from the application program 22, and the communication procedure request part 52 specifies the data request by the diagnose instruction.

A step S7 decides whether or not there is a write request (or write request is held). In this case, a write request is held, and the process advances to a step S8 because the decision result in the step S7 is YES.

The step S8 carries out a data transfer process by copying the data from the transmission buffer 31 of the operating system OS(1) to the reception buffer 32 of the operating system OS(2). More particularly, the data transfer is made by directly copying the data from the region of the transmission buffer 31 within the main storage region of the operating system OS(1) to the region of the reception buffer 32 within the main storage region of the operating system OS(2), as shown on the right side of FIG. 2.

The transmission is completed in a step S9.

When the transmission is completed in the step S9, a step S10 activates an interrupt to notify the completion of the transmission to the operating system OS(1) which held the write request.

Therefore, the data transfer mechanism 8 within the virtual machine control program 7 holds the write request in response to the write request from the operating system OS(1), and in response to the read request from the operating system OS(2), the data transfer mechanism 8 within the virtual machine control program 7 copies the data from the region of the transmission buffer 31 of the main storage region in which the write request being held was made to the region of the reception buffer 32 of the main storage region in which the read request was made. For this reason, it is possible to transmit the data by a simple operation in which the data within the main storage region of the operating system OS(1) is copied to the main storage region of the operating system OS(2). In addition, it is possible to notify the completion of the transmission to the operating system OS(1) by a single interrupt.

Next, a more detailed description will be given of the embodiment for the case where the read request is held in FIG. 1B, by referring to FIG. 3.

In FIG. 3, a step S11 issues a read request. This read request is issued from the application program 22 of the operating system OS(2).

A step S12 carries out a read process and issues a diagnose instruction to make the data request. More particularly, the read processing part 42 of the operating system OS(2) shown in FIG. 1B analyzes the read request issued from the application program 22, and the communication procedure request part 52 instructs the data request by the diagnose instruction. The transmission buffer 31 of the operating system OS(1) and the address of this transmission buffer 31, and the reception buffer 32 of the operating system OS(2) and the address of this reception buffer 32 are set during an open process.

A step S13 decides whether or not there is no write request (or no write request is held). In this case, no write request is held, and the process advances to a step S14 because the decision result in the step S13 is YES.

The step S14 carries out a hold process to store the contents of the read request, and the series of operations of the read process once end.

A step S15 issues a write request. This write request is issued from the application program 21 of the operating system OS(1) shown in FIG. 1B.

A step S16 carries out a write process and issues a diagnose instruction to specify the write data length. More particularly, the write processing part 41 of the operating system OS(1) shown in FIG. 1B analyzes the write request issued from the application program 21, and the communication procedure request part 51 instructs the data transmission by the diagnose instruction.

A step S17 decides whether or not there is a read request (or read request is held). In this case, a read request is held, and the process advances to a step S18 because the decision result in the step S17 is YES.

The step S18 carries out a data transfer process by copying the data from the transmission buffer 31 of the operating system OS(1) to the reception buffer 32 of the operating system OS(2). More particularly, the data transfer is made by directly copying the data from the region of the transmission buffer 31 within the main storage region of the operating system OS(1) to the region of the reception buffer 32 within the main storage region of the operating system OS(2).

The transmission is completed in a step S19.

When the transmission is completed in the step S19, a step S20 activates an interrupt to notify the completion of the transmission to the operating system OS(2) which held the read request.

Therefore, the data transfer mechanism 8 within the virtual machine control program 7 holds the read request in response to the read request from the operating system OS(2), and in response to the write request from the operating system OS(1), the data transfer mechanism 8 within the virtual machine control program 7 copies the data from the region of the transmission buffer 31 of the main storage region in which the write request was made to the region of the reception buffer 32 of the main storage region in which the read request being held was made. For this reason, it is possible to transmit the data by a simple operation in which the data within the main storage region of the operating system OS(1) is copied to the main storage region of the operating system OS(2). In addition, it is possible to notify the completion of the transmission to the operating system OS(2) by a single interrupt.

FIG. 4 shows a block system corresponding to an essential part of this embodiment. In FIG. 4, those parts which are the same as those corresponding parts in FIGS. 1A and 1B are designated by the same reference numerals, and a description thereof will be omitted.

In FIG. 4, a work application 23 is an application program for carrying out a work process. A system output transfer part 24 transfers and requests a process between the operating systems OS(1) and OS(2). A file transfer part 25 makes a file transfer between the operating systems OS(1) and OS(2). An application interface 26 transfers and receives data between the operating systems OS(1) and OS(2) for the work application 23, so as to carry out a distributed processing.

A processing part 43 carries out processes such as opening the data transfer mechanism 8, making a write request (data transfer request) to the data transfer mechanism 8, making a read request (data transfer request) to the data transfer mechanism 8, and closing the data transfer mechanism 8. A communication procedure request part 53 decomposes the request from the processing part 43 into the communication procedures (or protocols) such as the connect request, the connect acknowledge, the transmission request, the transmission acknowledge and the disconnect request, and notifies the request to the data transfer mechanism 8 within the virtual machine control program 7 in the form of the protocol.

The virtual machine control program 7 generally controls a plurality of operating systems such as the operating systems OS(1) and OS(2) in the respective spaces. In this embodiment, the virtual machine control program 7 includes the data transfer mechanism for copying the data between the main storage regions of the operating systems OS(1) and OS(2).

According to this embodiment, the inter-system communication between the operating systems OS(1) and OS(2) can be carried out at a high speed by the simple process of copying the data between the main storage regions of the operating systems OS(1) and OS(2).

Further, the present invention is not limited to these embodiments, but various variations and modifications may be made without departing from the scope of the present invention.

What is claimed is:

1. An inter-system communication system for communicating between at least two operating systems, said inter-system communication system comprising:
   a computer comprising:
      a virtual machine control program for controlling at least first and second operating systems,
      a data transfer mechanism provided in said virtual machine control program, and
      request means, provided in each of the first and second operating systems, for transmitting a transfer request to said data transfer mechanism;
   a main storage coupled to said computer and comprising respective, first and second virtual main storage regions corresponding to the first and second operating systems, said first and second virtual main storage regions having respective first and second buffer regions; and
   said data transfer mechanism transferring data between the first and second operating systems by directly copying the data from one of the first buffer region and the second buffer region to the other of the first buffer region and the second buffer region in response to the transfer request from the request means of one of the first and second operating systems.

2. The inter-system communication system as claimed in claim 1, which further comprises an application program, provided in each of the first and second operating systems, for issuing the transfer request and for transmitting the transfer request to the request means of a corresponding one of the first and second operating systems.

3. The inter-system communication system as claimed in claim 2, wherein said request means includes a transfer part for transmitting the transfer request to said data transfer mechanism in conformance with a communication procedure.

4. An inter-system communication system for communicating between at least two operating systems, said inter-system communication system comprising:
   a computer comprising:
      a virtual machine control program for controlling at least first and second operating systems,
      a data transfer mechanism provided in said virtual machine control program,
      request means, provided in each of the first and second operating systems, for transmitting a transfer request to said data transfer mechanism,
      wherein said request means includes a transfer part for transmitting the transfer request to said data transfer mechanism in conformance with a communication procedure, and
      wherein said transfer part decomposes the transfer request into a protocol of the communication procedure and transmits the transfer request to said data transfer mechanism by issuing a predetermined instruction, and
      an application program, provided in each of the first and second operating systems, for issuing the transfer request and for transmitting the transfer request to the request means of a corresponding one of the first and second operating systems; and
   a main storage coupled to said computer and comprising respective, first and second virtual main storage regions corresponding to the first and second operating systems, said first and second virtual main storage regions having respective first and second buffer regions,
   said data transfer mechanism transferring data between the first and second operating systems by directly copying the data from one of the first buffer region and the second buffer region to the other of the first buffer region and the second buffer region in response to the transfer request from the request means of one of the first and second operating systems.

5. The inter-system communication system as claimed in claim 4, wherein the protocol is selected from a group consisting of a connect request, a connect acknowledge, a transmission request, a transmission acknowledge and a disconnect request.

6. An inter-system communication system for communicating between at least two operating systems, said inter-system communication system comprising:
   a computer comprising:
      a virtual machine control program for controlling at least first and second operating systems,
      a data transfer mechanism provided in said virtual machine control program,
      request means, provided in each of the first and second operating systems, for transmitting a transfer request to said data transfer mechanism, and
      an interrupt handler, provided in each of the first and second operating systems, for notifying a completion of the data transfer to one of the first and second operating systems from which the transfer request originates by making an interrupt to said one of the first and second operating systems when activated by said data transfer mechanism; and a main storage coupled to said computer and comprising respective, first and second virtual main storage regions corresponding to the first and second operating systems, said first and second virtual main storage regions having respective first and second buffer regions, said data transfer mechanism transferring data between the first and second operating systems by directly copying the data from one of the first buffer region and the second buffer region to the other of the first buffer region and the second buffer region in response to the transfer request from the request means of one of the first and second operating systems.

7. The inter-system communication system as claimed in claim 6, wherein the completion of the data transfer is notified by a single interrupt for one write request and one read request.

8. An inter-system communication system for communicating between at least two operating systems, said inter-system communication system comprising:

a computer comprising:
a virtual machine control program for controlling at least first and second operating systems,
a data transfer mechanism provided in said virtual machine control program, and
request means, provided in each of the first and second operating systems, for transmitting a transfer request to said data transfer mechanism;

a main storage coupled to said computer and comprising respective, first and second virtual main storage regions corresponding to the first and second operating systems, said first and second virtual main storage regions having respective first and second buffer regions; and said data transfer mechanism transferring data between the first and second operating systems by directly copying the data from one of the first buffer region and the second buffer region to the other of the first buffer region and the second buffer region in response to the transfer request from the request means of one of the first and second operating systems, wherein said request means of the first operating system notifies said data transfer mechanism of a write request when the write request is generated within the first operating system, and said data transfer mechanism transfers the data from the first buffer region to the second buffer region and issues an interrupt to notify a completion of the write request to the first operating system if a read request from the second operating system is held in said data transfer mechanism.

9. The inter-system communication system as claimed in claim 8, wherein said data transfer mechanism holds the write request if no read request is held therein, and transfers the data from the first buffer region to the second buffer region and issues an interrupt to notify a completion of the write request to the first operating system if a read request from the second operating system is received by said data transfer mechanism.

10. The inter-system communication system as claimed in claim 9, wherein said data transfer mechanism holds the read request if no write request is held therein, and transfers the data from the first buffer region to the second buffer region and issues an interrupt to notify a completion of the read request to the second operating system if a write request from the first operating system is received by said data transfer mechanism.

11. An inter-system communication system for communicating between at least two operating systems, said inter-system communication system comprising:

a computer comprising:
a virtual machine control program for controlling at least first and second operating systems,
a data transfer mechanism provided in said virtual machine control program, and
request means, provided in each of the first and second operating systems, for transmitting a transfer request to said data transfer mechanism;

a main storage coupled to said computer and comprising respective, first and second virtual main storage regions corresponding to the first and second operating systems, said first and second virtual main storage regions having respective first and second buffer regions; and said data transfer mechanism transferring data between the first and second operating systems by directly copying the data from one of the first buffer region and the second buffer region to the other of the first buffer region and the second buffer region in response to the transfer request from the request means of one of the first and second operating systems, wherein said request means of the second operating system notifies Said data transfer mechanism of a read request when the read request is generated within the second operating system, and said data transfer mechanism transfers the data from the first buffer region to the second buffer region and issues an interrupt to notify a completion of the read request to the second operating system if a write request from the first operating system is held in said data transfer mechanism.

12. An inter-system communication system for communicating between at least two operating systems, said inter-system communication system comprising:

a computer comprising:
a virtual machine control program for controlling at least first and second operating systems,
a data transfer mechanism provided in said virtual machine control program, and
request means, provided in each of the first and second operating systems, for transmitting a transfer request to said data transfer mechanism,
wherein the request means makes the transfer request to said data transfer mechanism by issuing a diagnostic instruction which includes specifying a write data length or a data request;

a main storage coupled to said computer and comprising respective, first and second virtual main storage regions corresponding to the first and second operating systems, said first and second virtual main storage regions having respective first and second buffer regions; and said data transfer mechanism transferring data between the first and second operating systems by directly copying the data from one of the first buffer region and the second buffer region to the other of the first buffer region and the second buffer region in response to the transfer request from the request means of one of the first and second operating systems.

* * * * *